(12) United States Patent
You et al.

(10) Patent No.: US 7,318,006 B2
(45) Date of Patent: Jan. 8, 2008

(54) ALARM ANALYSIS METHODS AND SYSTEMS CAPABLE OF MULTI-PURPOSE FUNCTION

(75) Inventors: Huei-Shyang You, Taoyuan County (TW); Yi-Chun Chang, Kinmen County (TW)

(73) Assignee: Industrial Technology Research Institute, Hsinchu (TW)

( * ) Notice: Subject to any disclaimer, the term of this patent is extended or adjusted under 35 U.S.C. 154(b) by 43 days.

(21) Appl. No.: 11/318,429

(22) Filed: Dec. 28, 2005

(65) Prior Publication Data

US 2006/0156967 A1    Jul. 20, 2006

(30) Foreign Application Priority Data

Dec. 30, 2004    (TW) .............................. 93141343 A

(51) Int. Cl.
G06F 11/00    (2006.01)
G08B 7/00    (2006.01)

(52) U.S. Cl. ..................................... 702/183

(58) Field of Classification Search ................ 702/183
See application file for complete search history.

(56) References Cited

U.S. PATENT DOCUMENTS 6,405,204 B1 *    6/2002    Baker et al. .............. 705/36 R

* cited by examiner

Primary Examiner—Michael P. Nghiem
Assistant Examiner—Cindy D. Khuu
(74) Attorney, Agent, or Firm—Birch, Stewart, Kolasch & Birch, LLP

(57) ABSTRACT

An alarm analysis method capable of multi-purpose function. A plurality of efficiency indices are defined, including statistical-data-configuration, data-set, background-alarm-rate, peak-alarm-rate, active-alarm-distribution, bad-actors-identification, and alarm-report indices. A data warehouse is created according to the efficiency indices and using an online analytical processing method. A plurality of user interfaces are created according to the data warehouse and analysis results. The data warehouse is accessed using the user interfaces to retrieve the analysis results.

36 Claims, 34 Drawing Sheets
(6 of 34 Drawing Sheet(s) Filed in Color)

| PointTag | AlarmCount | System | Priority |
|---|---|---|---|
| AIT110B-AV | 18 | WWT/LSR | 2 |
| ECAL105MI1 | 12 | CR | 2 |
| NCAL201MI1 | 7 | CR | 2 |
| LCP-PCWP1 | 7 | I&E | 2 |
| PAM122-TEST | 7 | I&E | 3 |
| PAM123-TEST | 7 | I&E | 3 |
| PAH36TI171 | 5 | HAVC | 2 |
| BMAUAW5LI1 | 4 | CR | 1 |
| 13MN0307NH3 | 4 | AMC | 2 |
| 9CH02TI153 | 4 | HAVC | 2 |
| 02ZS520D | 4 | WWT/LSR | 2 |
| 13MN0211NH3 | 3 | AMC | 2 |
| 13MN0212NH3 | 3 | AMC | 2 |
| 13MN0214NH3 | 3 | AMC | 2 |
| 13SIAAP03NH3 | 3 | AMC | 2 |
| 13SIAAP04TS | 3 | AMC | 2 |
| 01RIA1073B | 3 | UPW | 2 |
| BCS-AVER3 | 3 | WWT/LSR | 3 |
| OPC-WWT-COMM | 2 | I&E | 1 |
| OPC-GIS-COMM | 2 | I&E | 1 |

FIG. 5B

| Eventtime | System | Priority | PointTag | AlarmCount |
|---|---|---|---|---|
| 2004/8/8 AM 03:59:06 | | WWT/LSR | GMAUAW16CI1 | 1 |
| 2004/8/8 AM 04:00:23 | CR | 3 | AMAUAW2CI1 | 1 |
| 2004/8/8 AM 06:16:11 | CR | 3 | 01LIA1021C | 1 |
| 2004/8/8 AM 06:50:45 | UPW | 2 | AMAUAW2CI1 | 1 |
| 2004/8/8 AM 06:59:56 | CR | 3 | CMAUAW1CI1 | 1 |
| 2004/8/8 AM 07:02:27 | CR | 3 | CMAUAW4CI1 | 1 |
| 2004/8/8 AM 07:13:41 | CR | 3 | 02LS530 | 1 |
| 2004/8/8 AM 07:39:23 | WWT/LSR | 2 | BCS-AVER3 | 1 |
| 2004/8/8 AM 08:30:02 | WWT/LSR | 3 | PAM122-TEST | 1 |
| 2004/8/8 AM 08:30:02 | I&E | 3 | PAM123-TEST | 1 |
| 2004/8/8 AM 08:36:08 | I&E | 3 | AIT340-AV | 1 |
| 2004/8/8 AM 10:52:08 | WWT/LSR | 2 | 01LIA1011a | 1 |
| 2004/8/8 AM 11:48:25 | UPW | 2 | LCP-PCWP1 | 1 |

FIG. 6B

| myTestCube | | | |
|---|---|---|---|
| dragging sifting fields to here | | | |
| | Year ▽ Quarter\|Month\|Day\| | | |
| | ⊞2004 | ⊞2005 | Sum |
| | | | |
| System   PointTag | Alarmcount | Alarmcount | Alarmcount |
| AAS | 29 | | 29 |
| CDA | 0 | | 0 |
| CR | 151 | 15 | 166 |
| DCS I&E | 3 | 0 | 3 |
| DUCT TEMP | 2 | | 2 |
| HAVC | 54 | | 54 |
| OFFICE | 119 | | 119 |
| PCW | 50 | | 50 |
| PVCV | 0 | 2 | 2 |
| S/AEX/VEX | 3 | | 3 |
| THC | 1 | | 1 |
| UPS | 1 | | 1 |
| UPW | 1 | | 1 |
| WATER | 8 | 3 | 11 |
| WSL | | 2 | 2 |
| WWT | 8 | | 1 |
| Sum | 423 | 22 | 445 |

FIG. 10A

| myTestCube | | | | |
|---|---|---|---|---|
| dragging sifting fields to here | | | | |
| | | Year ▽ Quarter\|Month\|Day\| | | |
| | | ⊞2004 | ⊞2005 | Sum |
| | | | | |
| System | PointTag | Alarmcount | Alarmcount | Alarmcount |
| ⊞AAS | 5CW01FI166 | 8 | | 8 |
| | AASDCB01-ACT | 1 | | 1 |
| | AASDCB02-ACT | 1 | | 1 |
| | AASDCB03-ACT | 1 | | 1 |
| | AASDCB04-ACT | 1 | | 1 |
| | GEX02PDT-XA | 1 | | 1 |
| | VEX01PD1G120 | 1 | | 1 |
| | VEX01PDT-XA | 1 | | 1 |
| | VEX01OAI60 | 0 | | 0 |
| | VEX01RTM-ACT | 1 | | 1 |
| | VEX02RTM-ACT | 1 | | 1 |
| | VEX03RTM-ACT | 1 | | 1 |
| | VEX04RTM-ACT | 1 | | 1 |
| | VEXSB1PD110 | 1 | | 1 |
| | VEXSB1PD113 | 1 | | 1 |
| | WW01FI167 | 8 | | 8 |
| | Sum | 29 | | 29 |
| ⊞CDA | | | | |
| ⊞CR | | 151 | 15 | 166 |
| ⊞DCS I&E | | 3 | 0 | 3 |
| ⊞DUCT TEMP | | 2 | | 2 |

FIG. 10B

| myTestCube | | | | | | | |
|---|---|---|---|---|---|---|---|
| dragging sifting fields to here | | | | | | | |
| | Year ▽ \|Quarter\|Month\|Day\| | | | | | | |
| | ⊟ 2004 | | | | | ⊞ 2005 | Sum |
| | ⊟ Quarter 2 | | | Sum | | | |
| | ⊞ May | | Sum | | | | |
| System ▽ PointTag | Alarmcount | Alarmcount | Alarmcount | Alarmcount | Alarmcount | Alarmcount | Alarmcount |
| AAS | 29 | 29 | 29 | 29 | | 29 |
| CDA | 0 | 0 | 0 | 0 | | 0 |
| CR | 151 | 151 | 151 | 151 | 15 | 151 |
| DCS I&E | 3 | 3 | 3 | 3 | 0 | 3 |

FIG. 10C-1

| FIG. 10C-1 |
|---|
| FIG. 10C-2 |

| | | | | |
|---|---|---|---|---|
| DUCT TEMP | 2 | | 2 | 2 |
| HAVC | 54 | | 54 | 54 |
| OFFICE | 119 | | 119 | 119 |
| PCW | 50 | | 50 | 50 |
| PVCV | 0 | | 0 | 0 |
| | | | | |
| S/AEX/VEX | 3 | | | 3 |
| THC | 1 | | 1 | 1 |
| UPS | 1 | | 1 | 1 |
| UPW | 1 | | 1 | 1 |
| WATER | 8 | 3 | 11 | 11 |
| WSL | | 2 | 2 | 2 |
| WWT | 8 | | 1 | 1 |
| Sum | 423 | 22 | 445 | 445 |

FIG. 10C-2

| myTestCube | | | |
|---|---|---|---|
| dragging sifting fields to here | | | |
| | Year ▽ \| Quarter\|Month\|Day\| | | |
| | ⊟ 2004 | | |
| | ⊟ Quarter 2 | | Sum |
| | ⊞ May | Sum | |
| | 13 | 14 | 15 |
| System ▽ PointTag | Alarmcount | Alarmcount | Alarmcount |
| AAS | 4 | | |
| CDA | | | 0 |
| CR | 45 | 10 | 8 |
| DCS I&E | 1 | 1 | |
| DUCT TEMP | | | |
| HAVC | 12 | 4 | |
| OFFICE | 24 | 11 | 0 |

|  | 20 | Sum | Sum | Sum |
|---|---|---|---|---|
|  | Alarmcount | Alarmcount | Alarmcount | Alarmcount |
|  |  | 29 | 29 | 29 |
|  |  | 0 | 0 | 0 |
|  | 1 | 151 | 151 | 151 |
|  |  | 3 | 3 | 3 |
|  |  | 2 | 2 | 2 |
|  | 0 | 54 | 54 | 54 |
|  |  | 119 | 119 | 119 |

FIG. 10D-3

| PCW | 9 | 0 | |
|---|---|---|---|
| PVCV | 0 | | |
| S/AEX/VEX | | | |
| THC | | | |
| UPS | | | |
| UPW | | | |
| WATER | | | |
| WSL | 1 | | |
| WWT | | | |
| Sum | 96 | 26 | 8 |

FIG. 10D-4

|   | 18  | 14 | 9  |
|---|-----|----|----|
|   |     |    |    |
|   |     | 3  | 0  |
|   |     | 1  |    |
|   | 1   |    |    |
|   |     | 1  |    |
| 1 |     | 4  | 2  |
|   |     |    |    |
|   |     | 1  |    |
| 14| 140 | 50 | 88 |

FIG. 10D-5

|   | 50 | 50 | 50 |
|---|---|---|---|
|   | 0 | 0 | 0 |
|   | 3 | 3 | 3 |
|   | 1 | 1 | 1 |
|   | 1 | 1 | 1 |
|   | 1 | 1 | 1 |
|   | 8 | 8 | 8 |
|   |   |   |   |
|   | 1 | 1 | 1 |
| 1 | 423 | 423 | 423 |

FIG. 10D-6

|   | A | B | C | D | E | F |
|---|---|---|---|---|---|---|
| 1 | dragging page fields to here | | | | | |
| 2 | | | | | | |
| 3 | Alarmcount | Year ▽ | | | | |
| 4 | System ▽ | 2004 | Sum* | | | |
| 5 | AAS | 8 | 8 | | | |
| 6 | CDA | 0 | 0 | | | |
| 7 | CR | 97 | 97 | | | |
| 8 | DCS I&E | 7 | 7 | | | |
| 9 | GAS | 4 | 4 | | | |
| 10 | HAVC | 48 | 48 | | | |
| 11 | OFFICE | 16 | 16 | | | |
| 12 | S/AEX/VEX | 1 | 1 | | | |
| 13 | THC | 2 | 2 | | | |
| 14 | UPW | 5 | 5 | | | |
| 15 | WATER | 10 | 10 | | | |
| 16 | WWT | 67 | 67 | | | |
| 17 | Sum* | 265 | 265 | | | |

FIG. 10E

|   | A | B | C | D | E | F | G | H |
|---|---|---|---|---|---|---|---|---|
| 1 |   |   |   |   |   |   |   |   |
| 2 |   | dragging page fields to here |   |   |   |   |   |   |
| 3 | Alarmcount | Year ▽ | Week | Day |   |   | 2004 Total* | Sum * |
| 4 |   | 2004 |   |   |   |   |   |   |
| 5 |   | Week 25 |   |   | Week 25 Total* | Week 26 |   |   |
| 6 | System ▽ | 17 | 18 | 18 |   |   |   |   |
| 7 | AAS |   | 8 |   | 8 | 0 | 8 | 8 |
| 8 | CDA |   | 0 |   | 0 | 0 | 0 | 0 |
| 9 | CR | 3 | 20 | 23 | 46 | 51 | 97 | 97 |
| 10 | DCS I&B |   | 2 | 1 | 3 | 4 | 4 |   |
| 11 | GAS |   |   |   |   |   |   |   |
| 12 | HAVC | 0 | 0 | 1 | 1 | 47 | 48 | 48 |
| 13 | OFFICE |   |   |   |   | 16 | 48 | 48 |
| 14 | S/AEX/VEX |   |   |   |   |   | 16 | 16 |
| 15 | THC |   |   | 2 | 2 | 1 | 1 |   |
| 16 | UPW |   | 1 |   | 1 |   | 2 | 2 |
| 17 | WATER |   | 1 |   | 1 | 4 | 5 |   |
| 18 | WWT | 1 | 20 | 27 | 48 | 9 | 10 | 10 |
| 19 | Sum * | 4 | 52 | 54 | 110 | 19 | 67 | 67 |
|   |   |   |   |   |   | 155 | 265 | 265 |

FIG. 10F

ALARM ANALYSIS METHODS AND SYSTEMS CAPABLE OF MULTI-PURPOSE FUNCTION

BACKGROUND OF THE INVENTION

1. Field of the Invention

The invention relates to data analysis methods and systems, and more particularly, to alarm analysis methods and systems capable of multi-purpose function.

2. Description of the Related Art

Abnormal situations may cause damage to tools during production, such as when tools diverge from normal states due to single or repeated interference, affecting product quality and increasing manufacturing cost. Currently, abnormal situations during manufactures occur without significant alarm notification. When alarms are not prioritized, more critical abnormal situations cannot be processed first. If an alarm management system does not comprise a fine control interface, problems cannot be located rapidly. Additionally, multiple alarms can affect efficient response.

A portion of alarm management systems monitors process tools using distributed control system (DCS) and alarms notifying of abnormal situations. As described, however, simultaneous alarms can occur, resulting in inconvenience for production management. Additionally, manufacturers apply advanced process controls (APC) based on real production requirements to stabilize tools, requiring more alarms, nevertheless, inadequate alarm management can increase costs and risks.

An ideal alarm management system provides early detection of abnormal events, while shortening handling time and managing processes efficiently, as well as controlling side effects of abnormal events. As described, nuisance alarms may occur due to poor alarm management. Alarm management restricts an alarm number within a reasonable range. An ideal alarm management system sets priorities for alarms, removes improper or nuisance alarms, set optimum alarm limits, and other tasks. Additionally, an ideal alarm management system accommodates "Awareness", "Estimation". "Re-design for alarm management system", and "Sustained profit" steps, described as follows.

"Awareness" is an essential condition for an alarm management system, achieving desired function and purposes. "Estimation" collects alarm data according to defined functions and standards to estimate efficiency and security and areas for improvement. "Re-design for alarm management system" decreases alarm numbers and properly set alarm parameters, reviewing historical alarm records for implementation and distribution. "Sustained profit" inspects alarm overflow and unsuccessful processes, tracking the alarm management system regularly to discover abnormal problems for confirmation of regular operations.

Estimation, design, implementation, and maintenance for an alarm management system require enormous manpower and may result in alarm overflow with wrong design. Thus, an improved analysis method is desirable.

BRIEF SUMMARY OF THE INVENTION

Alarm analysis methods capable of multi-purpose function are provided. In an embodiment of such a method, a plurality of efficiency indices are defined, comprising statistical-data-configuration, data-set, background-alarm-rate, peak-alarm-rate, active-alarm-distribution, bad-actors-identification, and alarm-report indices. A data warehouse is created according to the efficiency indices using an online analytical processing method. A plurality of user interfaces are created according to the data warehouse and analysis results. The data warehouse is accessible using the user interfaces allowing retrieval of analysis results.

Also disclosed are alarm analysis systems capable of multi-purpose function. An embodiment of such a system comprises a server and client. The server provides a data warehouse and a user login interface. The client accesses the data warehouse using the user login interface to retrieve analysis results relating to alarm data. The data warehouse is created according to a plurality of efficiency indices using an online analytical processing method, efficiency indices comprising statistical-data-configuration, data-set, background-alarm-rate, peak-alarm-rate, active-alarm-distribution, bad-actors-identification, and alarm-report indices.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The present invention will become more fully understood from the subsequent detailed description and the accompanying drawings, which are given by way of reference only, and thus are not limitative of the present invention, and wherein;

FIG. 5B is a schematic view of an embodiment of the number, system, and priority relating to each alarm item in FIG. 5A;

FIG. 6B is a schematic view of an embodiment of the number, system, and priority relating to each alarm item in FIG. 6A;

FIGS. 10A~10D are schematic views of an embodiment of drill-down function implementation to alarm data based on system and time dimensions;

FIGS. 10E and 10F are schematic views of an embodiment of drill-down function implementation to alarm data using other applications.

DETAILED DESCRIPTION OF THE INVENTION

Figure 1:
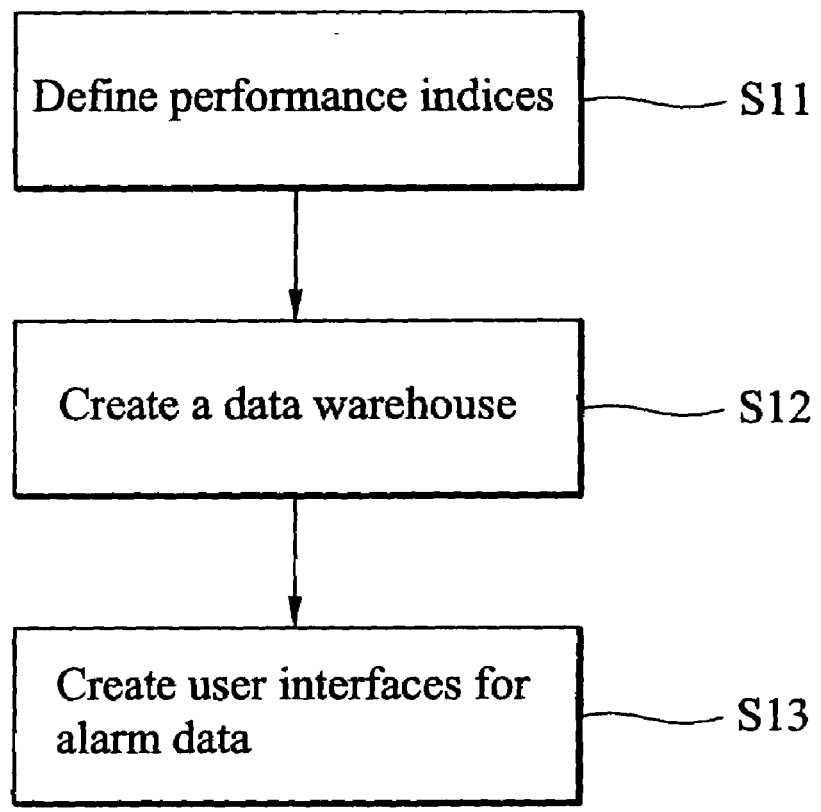
FIG. 1 is a flowchart of an embodiment of an alarm analysis method capable of multi-purpose function.

Several exemplary embodiments of the invention are described with reference to FIGS. 1 through 11, which generally relate to alarm analysis. It is to be understood that the following disclosure provides many different embodiments as examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The invention discloses alarm analysis methods and systems capable of multi-purpose function.

FIG. 1 is a flowchart of an embodiment of an alarm analysis method capable of multi-purpose function.

A plurality of efficiency indices are first defined (step S11). Referring to Attachments 1A~1F, the efficiency indices in the embodiment of the invention comprise statistical-data-configuration (as item 0.0 shown in Attachment 1A), data-set (as item 1.0 shown in Attachment 1A), background-alarm-rate (as item 2.0 shown in Attachment 1A), peak-alarm-rate (as item 3.0 shown in Attachment 1D), active-alarm-distribution (as item 4.0 shown in Attachment 1E), bad-actors-identification (as item 5.0 shown in Attachment 1E), and alarm-report (as item 6.0 shown in Attachment 1F) indices. The alarm report further comprises daily, weekly, monthly, quarterly, and yearly alarm reports. Additionally, tables shown in the Attachments comprise three fields of alarm item name (as the six described indices), target value (predetermined low and high thresholds), and formula explanation for each alarm item. The background-alarm-rate index further comprises all-alarms and enabled-alarms-only indices. The active-alarm-distribution index further comprises alarms-activated and unit/display-unit-alarm-distribution indices. Each index may further comprise a plurality of indices, detailed in the Attachments.

Next, a data warehouse is created according to the efficiency indices using an online analytical processing method (step S12). To satisfy efficiency for data analysis, a data warehouse and an online analytical processing (OLAP) method are combined for alarm analysis and historical data inspection, thus constructing data warehouse relay to support analysis for historical alarm data. Compared with traditional analysis methods, the OLAP method can rapidly react to transform and detect required data with different directions in different hierarchies and domains. Additionally, an embodiment of the invention applies data visualization techniques for fast information access. When a data warehouse is regarded as an extremely large reserve of historical data, comprising reporting, executive information system (EIS), data mining, and so forth, online data analysis can aggregate data from the data warehouse, substantially simplifying data query operations.

Technically, multidimensional databases separate data into dimensional and measurement parts. The dimensional part comprises characteristics relating to alarm data while the measurement part comprises measurable parts relating thereto. In an alarm management system, the dimensional part may indicate time, system, or area with respect to the system, while the measurement part may indicate an alarm number. Due to considerable data amount, an embodiment of the invention combines alarm optimization concepts, collocating OLAP methods and multidimensional operations, to select desired dimensions arbitrarily, thus shortening operating time. A data warehouse provides architecture for duplication of transaction data, applied for data query and analysis and extraction of historical alarm data. An OLAP method transforms stored alarm data in a data warehouse to analyzable information using a multidimensional analysis method. The information is stored in a multidimensional data cube.

Figure 2:
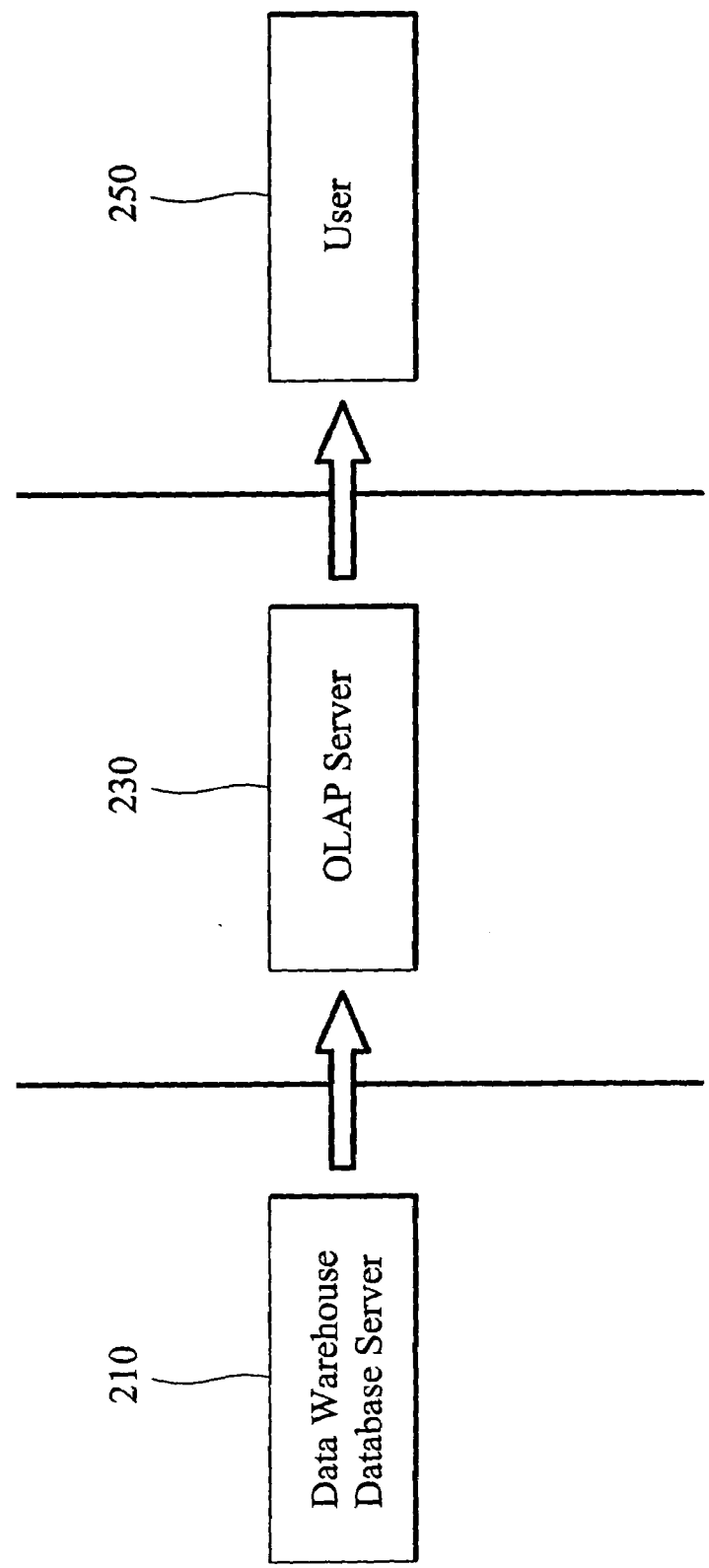
FIG. 2 is a schematic view of an embodiment of the architecture of a data warehouse.

FIG. 2 is a schematic view of an embodiment of the architecture of a data warehouse, a three-layered structure. The first layer comprises a data warehouse database server 210, storing source data. Source data can be stored in a relational database system or retrieved from external sources. The data is extracted, transformed, loaded, updated, and stored, and the data warehouse cannot be changed but can be shared in a data mart. The second layer comprises an OLAP server 230, transforming multidimensional data to relational an online analytical processing method (ROLAP) formats using a relational database management system or to multidimensional an online analytical processing method (MOLAP) formats. The third layer comprises a front end interface 250, further providing query and report tools, analysis tools, and data mining tools.

A database can add, delete, modify, and query data for access management. A data warehouse stresses information acquisition for problem analysis and multidimensional strategies to provide available information graphically. Further, a data warehouse provides dynamic and random report querying, OLAP, data mining, and dynamic forecasting functions. According to the described functions, a data warehouse provides a powerful search engine with useable graphic interfaces, constructs multidimensional data cubes (MDC) for information analysis, extracts available knowledge from large amounts of information, and dynamically simulates variation curves for optimum resource combination.

Alarm data is collected for data warehouse creation (step S21 shown in FIG. 3), and alarm data analysis implemented. According to defined efficiency indices, required dimensions comprising time, system, and area, for data cubes relating to the alarm data are created (step S22 shown in FIG. 3), and then required hierarchies, comprising year, week, and day, for the data cubes relating to the alarm data are created (step S23 shown in FIG. 3).

An OLAP system extracts data from a multidimensional database, processing daily transactions repeatedly and immediately implementing adding, modifying, and deleting operations for optimum process speed. An online transaction processing system extracts read-only data, repeatedly generated resulting in heavy load during database update.

Online transaction processing searches and collects data, using normalization structures to decrease storage space, while online analysis processes data provided for a database using anti-normalization structures (i.e. multidimensional model), simplifying access steps, reducing the number of times for table joining, and providing better efficiency.

Data cubes are important components in an online analysis processing system, comprising information relating to a multidimensional database, each comprising dimensional and measurement parts. Cells are located along intersections of each two dimensions and store data. A data cube comprises member, hierarchy, and level attributes.

Figure 4A:
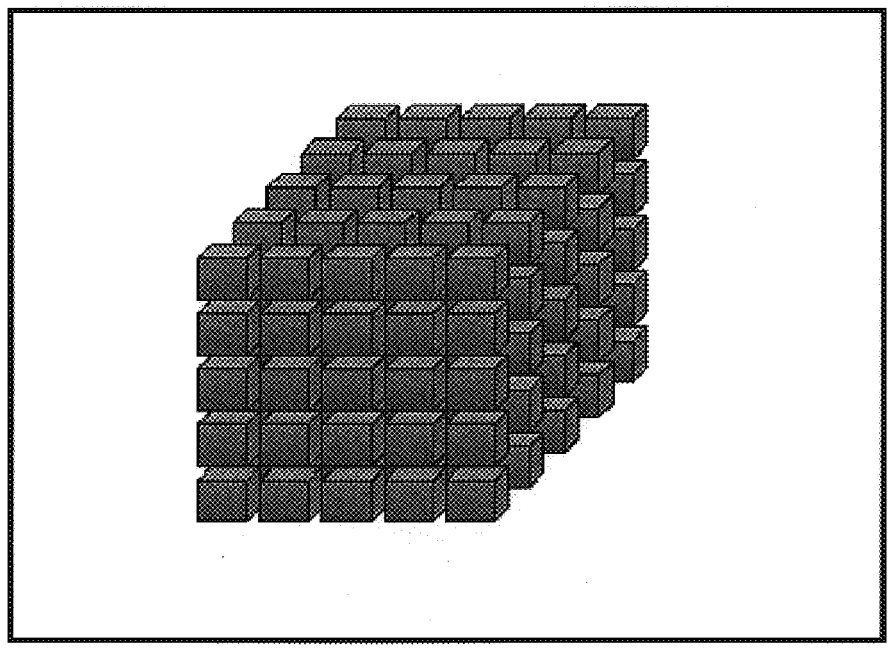
FIG. 4A is a schematic view of an embodiment of a data cube.
Figure 4B:
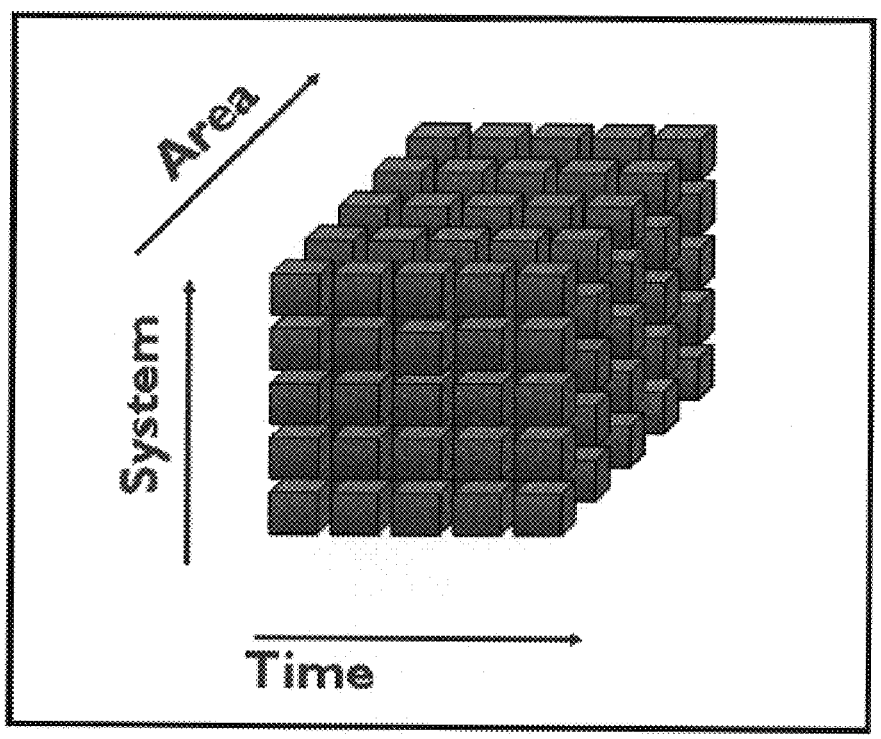
FIG. 4B is a schematic view of an embodiment of the dimension relating to a data cube.
Figure 4C:
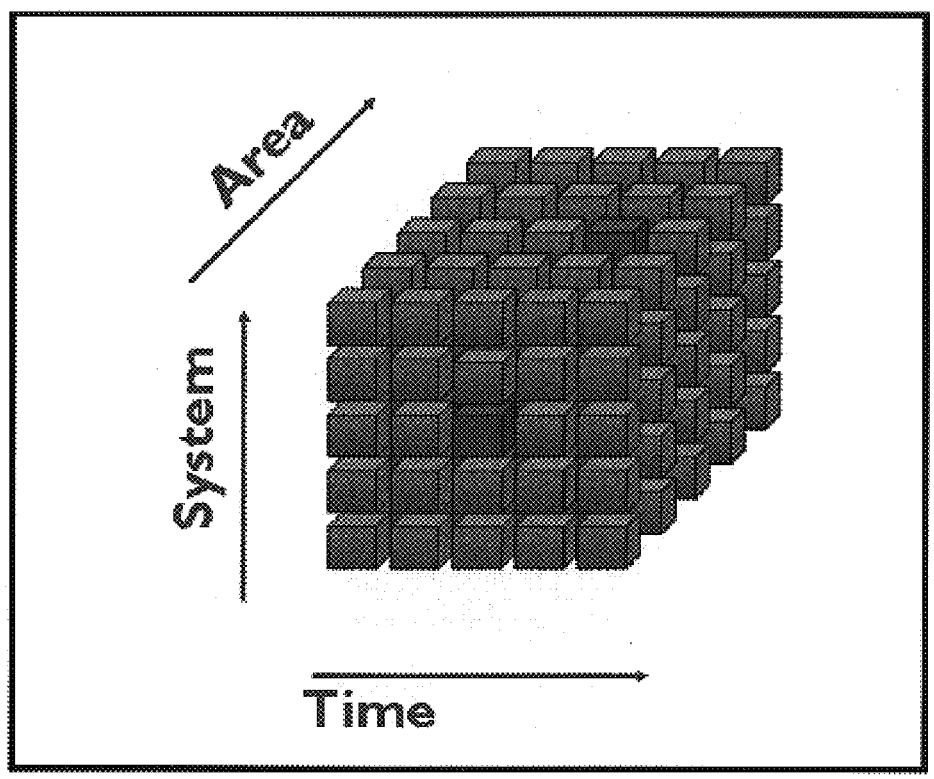
FIG. 4C is a schematic view of an embodiment of the measurement relating to a data cube.
Figure 4D:
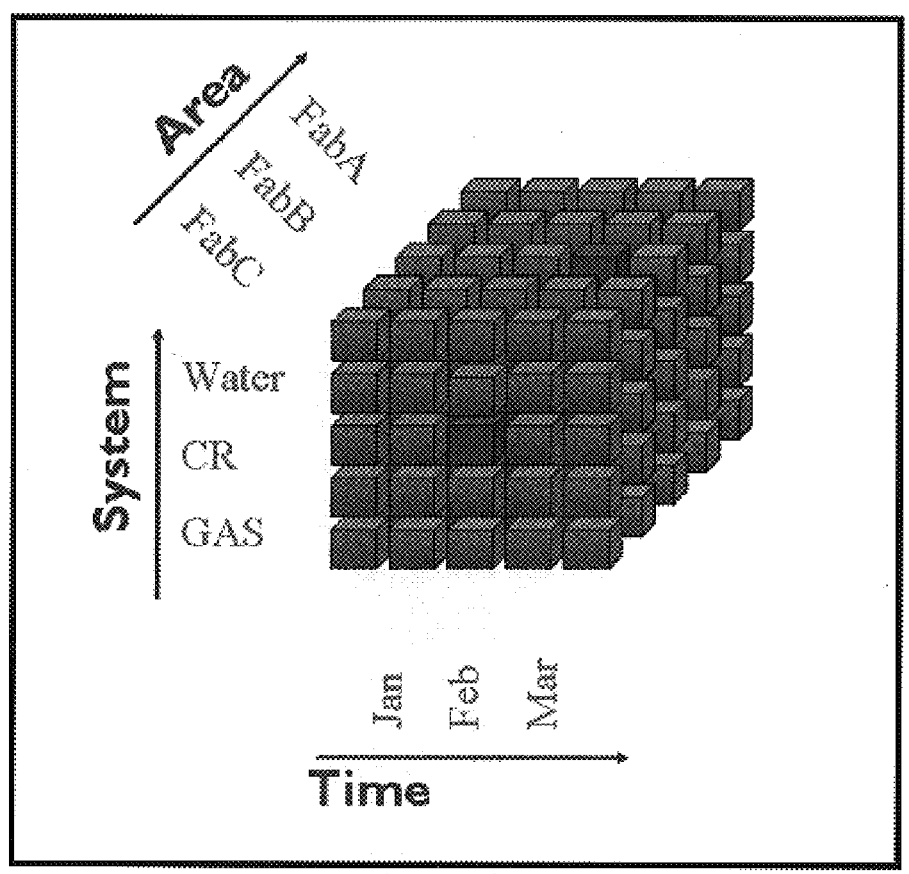
FIG. 4D is a schematic view of an embodiment of the member relating to a data cube.
Figure 4E:
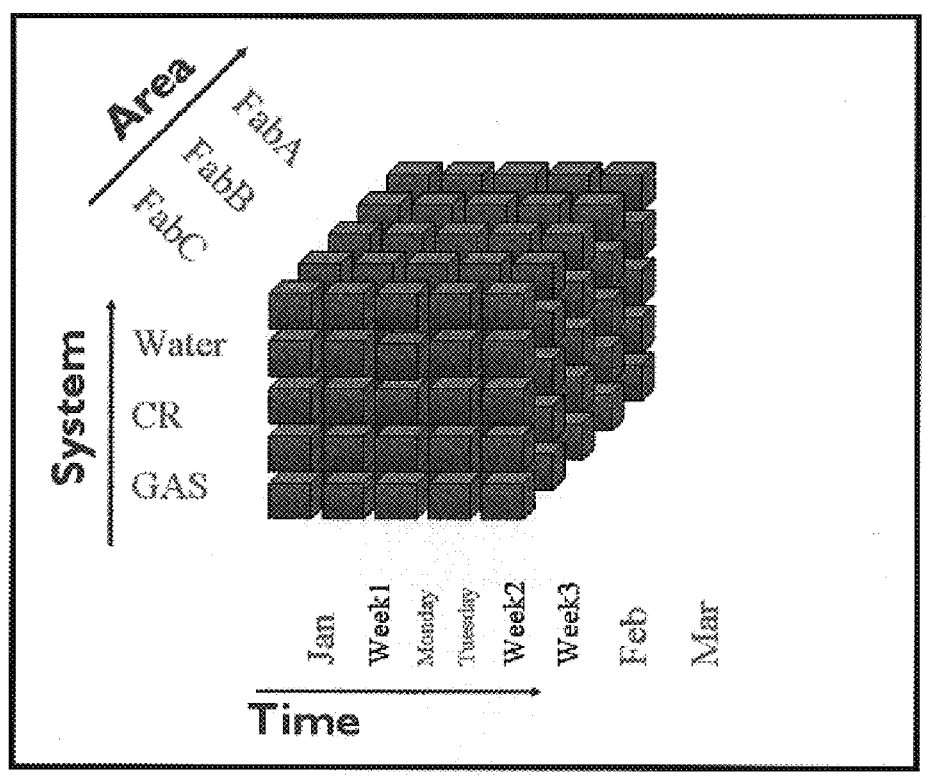
FIG. 4E is a schematic view of an embodiment of the hierarchy relating to a data cube.
Figure 4F:
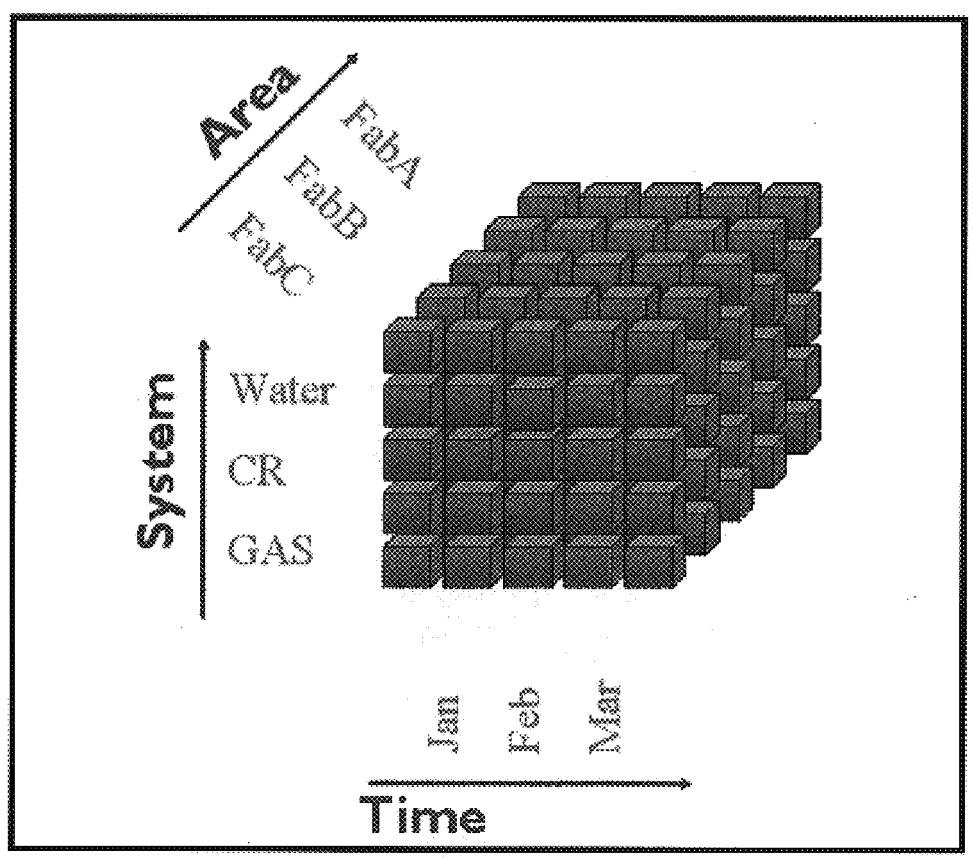
FIG. 4F is a schematic view of an embodiment of the level relating to a data cube.
Figure 5A:
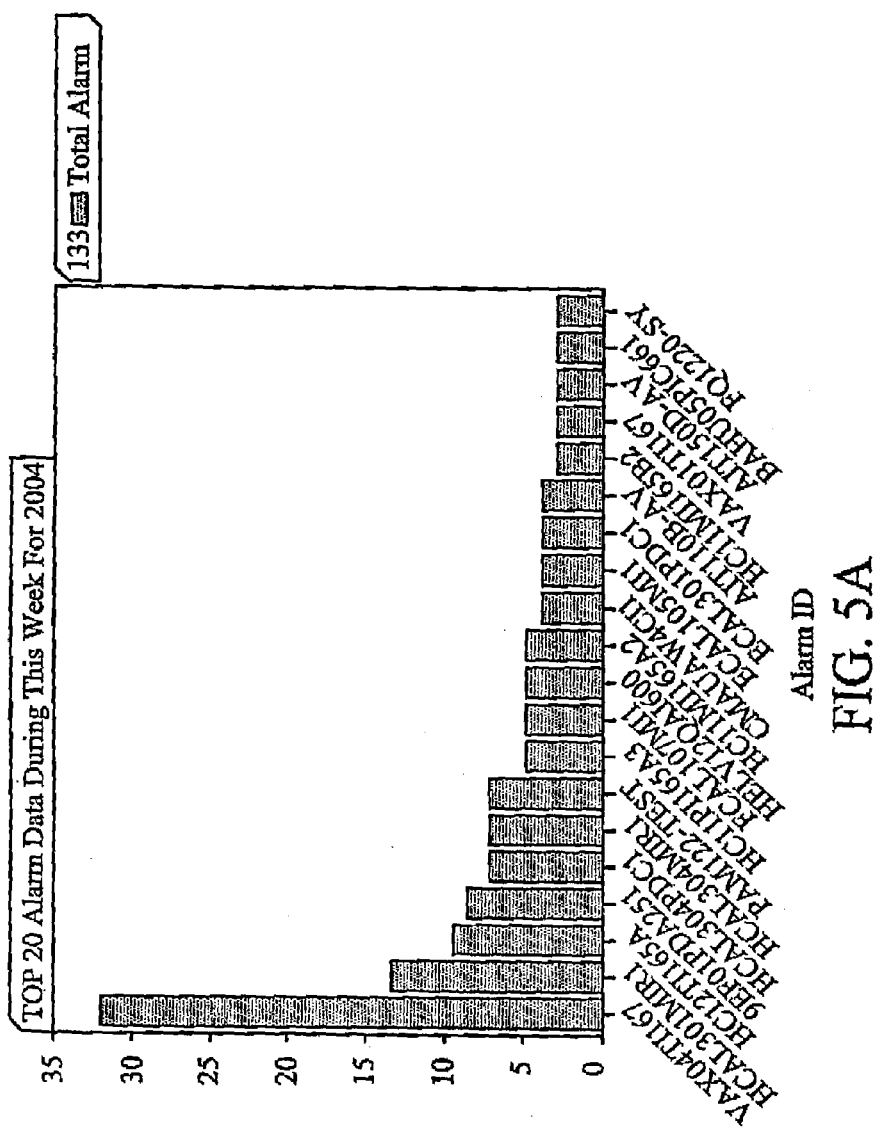
FIG. 5A is a schematic view of an embodiment of alarm data analysis generated at a predetermined period.

FIG. 4A is a schematic view of an embodiment of a data cube. FIG. 4B is a schematic view of an embodiment of the dimension relating to a data cube. FIG. 4C is a schematic view of an embodiment of the measurement relating to a data cube. FIG. 4D is a schematic view of an embodiment of the member relating to a data cube. FIG. 4E is a schematic view of an embodiment of the hierarchy relating to a data cube. FIG. 4F is a schematic view of an embodiment of the level relating to a data cube.

A data cube represents a multidimensional environment, storing aggregate information or pre-calculated query results. Data cubes may be separate and multiple attributes represented by multidimensional arrays. Each attribute represents a single part of a data cube, thus determining ranges of the cells. As shown in FIGS. 4A~4F, three dimensions of a data cube represent time, system, and area respectively. Additionally, a measurement part of a data cube indicates a calculated value relating to a cell. A value, for example, relating to alarm C at time A and location B is calculated. A member of a data cube represents a name of a data item within dimensions, defining data locations in a data cube. A cell, for example, is obtained from manufacturer A (area). A hierarchy of data cube data paternity within dimensions, the lower degree located at the lower location. Alarm data, for example, obtained in a month can be subdivided into weekly data (i.e. obtained on the first week of the month) or daily data (i.e. obtained on Thursday of the second week of the month). A level of a data cube represents a position where a cell is located. A position within hierarchies of alarm data obtained on January, for example, is defined as "month". As described, the alarm number detected using a system within a location at a period can thus be calculated. The three dimensions of an alarm data cube are system, area, and time. After processing aggregate alarm data, measurements relating to the alarm data are stored in data cubes for rapid query. Global data can be queried according to dimension transformation with desired time, area, and system dimensions and an OLAP system then returns a required alarm number.

Figure 3:
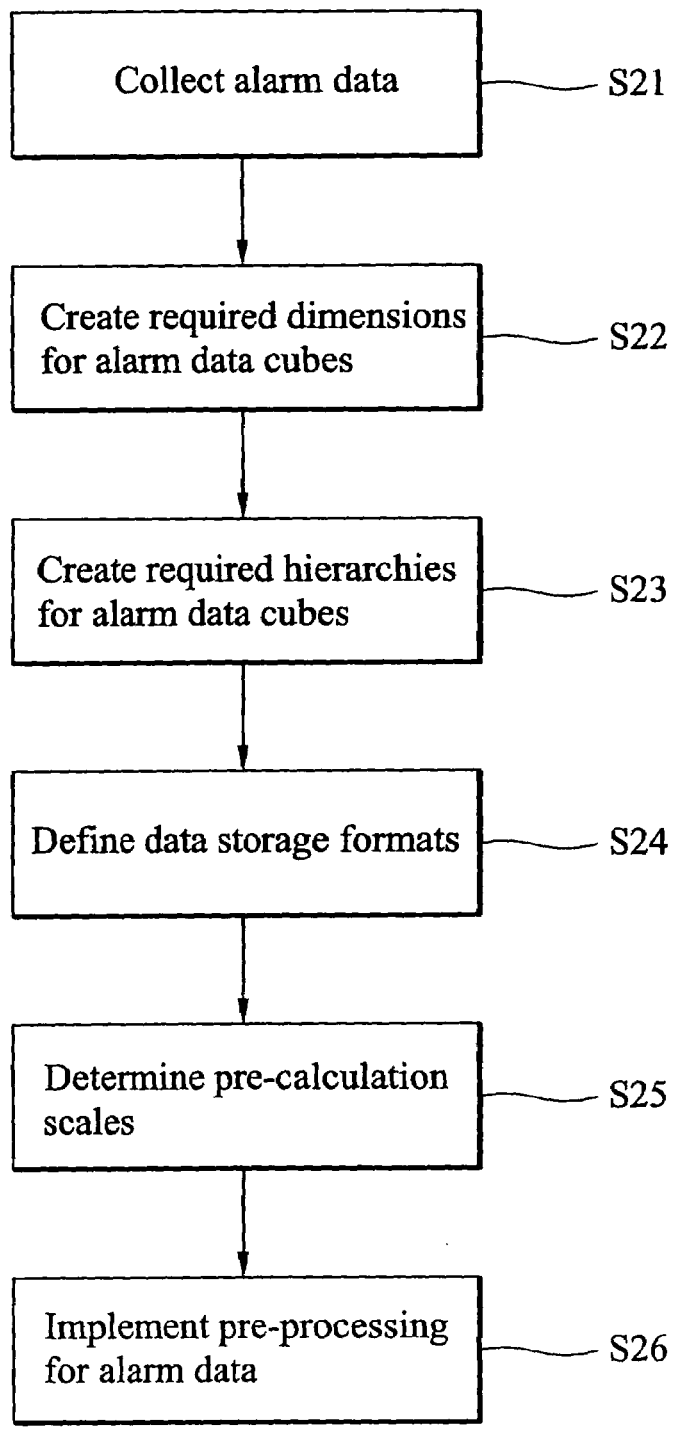
FIG. 3 is a flowchart of an embodiment of a method for data warehouse creation.

Next, storage formats relating to alarm data are selected (step S24 shown in FIG. 3). A large-scale database may use an ROLAP system for data storage. The invention utilizes an alarm system for data extraction and application frame analysis, translating alarm data according to multi-purpose function analysis and diagnosis for applicable data extraction and application frame analysis (as shown in FIGS. 5A~10), such that data mining and access can be immediately queried for confirmation of data consistency and integration. OLAP provides an operational interface for a front end user of a data warehouse system, comprising an MOLAP or ROLAP system.

Next, pre-calculation scales relating to alarm data are determined (step S25 shown in FIG. 3). Frequently queried data possesses 20% of the data amount. Only the 20% data amount calculated can save time and rapidly obtain desired data. An MOLAP system can collect multidimensional alarm data and alarm aggregate data to a specified data structure. An MOLAP system, for example, provides short response time according to pre-calculations and aggregate data. Response performance may result in discrepancies based on different percentages of data cube aggregation and design modes. Generally, query logics are designed and analyzed according to expected requirements, applicable to report data frequently used with rapid response. Therefore, cost time and space for data cube creation are appropriately considered (obstruction may occur when data amount exceeds 50 Gigabytes, for example) and data cubes must be reconstructed when data is increased.

Next, a pre-processing operation is implemented on alarm data (step S26 shown in FIG. 3), pre-processing aggregate data for instant response. An ROLAP system stores aggregate data in a relational database management system (RDBMS) or a database of a data warehouse based on series relationships relating to alarm dimensions, providing available storage positions without further creating another data cube. Dimensional data are further aggregated into multiple hierarchy combination aggregate data, such hierarchy design providing data in upper or lower levels, comprising detailed and total data. Data combination based on aggregate tables can be implemented according to view concepts or using a storage procedure. Relatively, ROLAP retrieves data from a database, establishment for a bottom-layered database is essential to database performance, bulk storage creation, and user access affecting OLAP analysis. Additionally, ROLAP applies Structured Query Language (SQL) via parallel processing of RDBMS to benefit automated operations for aggregate data.

MOLAP uses bitmap index technologies, operations thereof implemented according to tables 1 and 2.

TABLE 1

| Time | Area | Product | ID | Asia | Europe | South America |
|---|---|---|---|---|---|---|
| 1st week | Asia | Package | 1 | 1 | 0 | 0 |
| 2nd week | Europe | Technology | 2 | 0 | 1 | 0 |
| 3rd week | Asia | Technology | 3 | 1 | 0 | 0 |
| 4th week | Europe | Package | 4 | 0 | 1 | 0 |
| 5th week | South America | Package | 5 | 0 | 0 | 1 |

TABLE 2

| Time | Area | Product | ID | Package | Technology |
|---|---|---|---|---|---|
| 1st week | Asia | Package | 1 | 1 | 0 |
| 2nd week | Europe | Technology | 2 | 0 | 1 |
| 3rd week | Asia | Technology | 3 | 0 | 1 |
| 4th week | Europe | Package | 4 | 1 | 0 |
| 5th week | South America | Package | 5 | 0 | 1 |

As shown in Tables 1 and 2, the left portion is real data while the right portion is product index data. Corresponding fields are filled with corresponding value (0 or 1), thus locating a desired value. Package information for Asia, for example, can be located according to index values (0 or 1). The location process can be accelerated by logical operations (such as AND, OR, XOR, NOT, and others) using hardware.

In Table 3, the characteristics of MOLAP, ROLAP, and hybrid an online analytical processing method (HOLAP) for data processing structures are illustrated.

TABLE 3

| Data Processing Structure | Characteristic |
| --- | --- |
| MOLAP | 1. apply to non-relational databases<br>2. easy for maintenance<br>3. no need of information technical background for users<br>4. use bitmap indices without connection |
| ROLAP | 1. apply to relational databases<br>2. great elasticity<br>3. rapid file creation<br>4. suitable for bulk databases<br>5. no need of movement for current data |
| HOLAP | 1. combination of MOLAP and ROLAP<br>2. apply to general situations |

A data warehouse applied to an alarm management system can thus be created based on steps S21~S26. Next, data extraction and application frames (i.e. multiple user interfaces) are created according to the data warehouse and analysis results based on the described efficiency indices (step S13), accessed by users through a network.

In an alarm management system of the invention, data cubes store aggregate data, queried according to dimensions. Aggregate data is located at intersections of dimensions, each intersection storing measurement values. Structure and model designs for data warehouse are identical among the OLAP, MOLAP, and ROLAP systems, the difference therebetween being data access points. Additionally, the invention controls alarms via a network by which a server/client structure connects to a database in a bulk data warehouse at a back end, controlling and managing users and reports using additionally created objects, located in the database at the back end for management and storage.

Referring to FIGS. 5A~10F, the invention executes optimized alarm data analysis, graphically presenting analysis results on web pages for access.

Figure 6A:
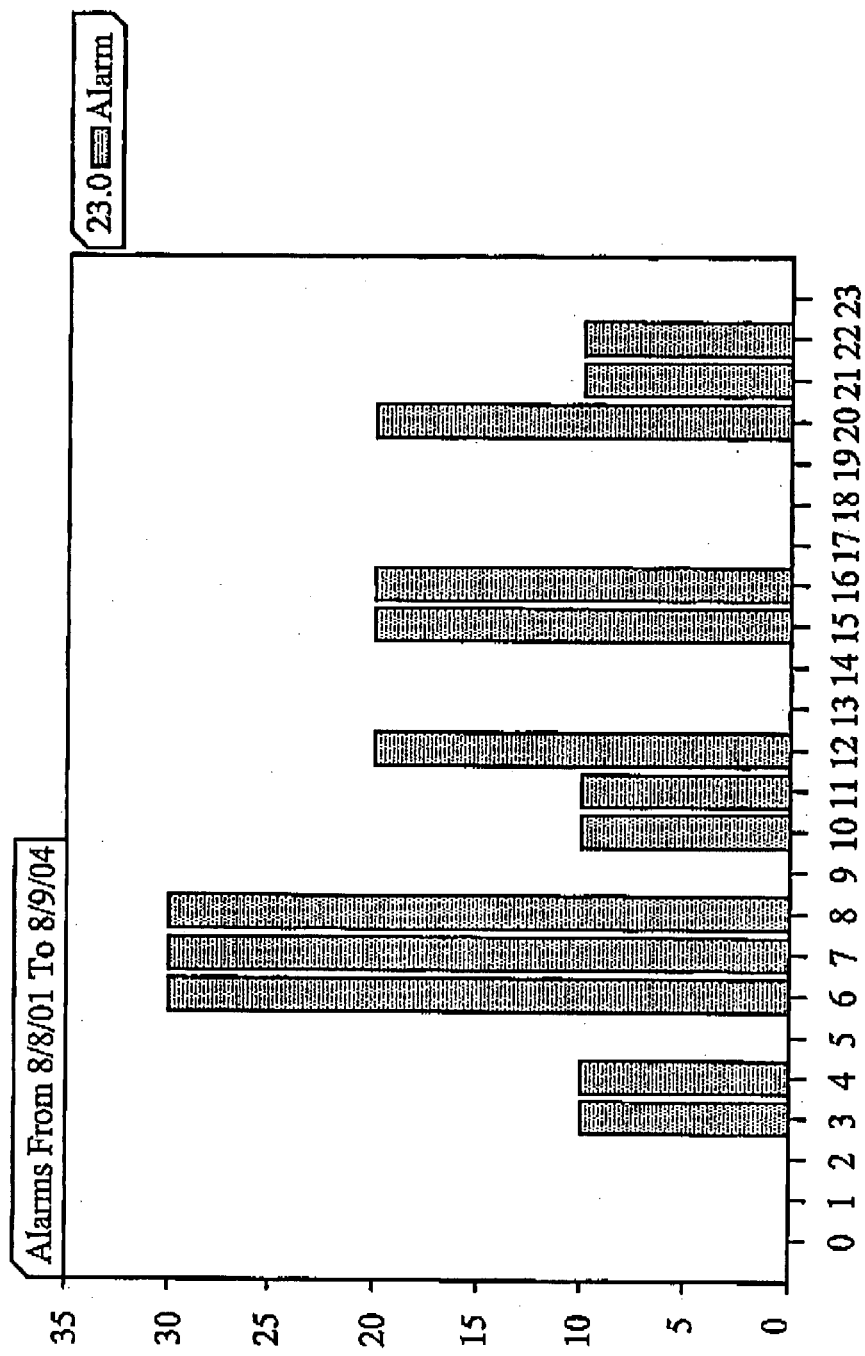
FIG. 6A is a schematic view of an embodiment of alarm data analysis in a single day.
Figure 7A:
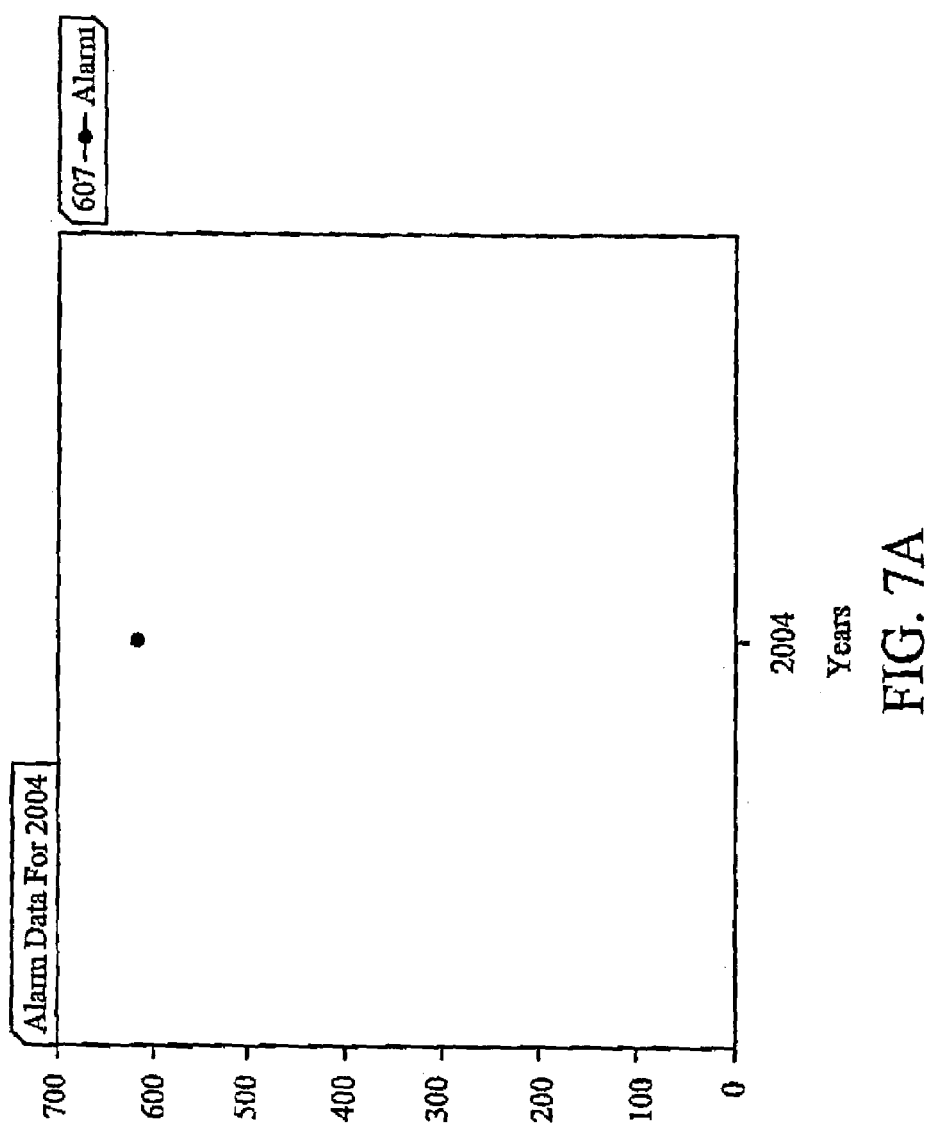
FIGS. 7A~7C are schematic views of an embodiment of drill-down function implementation to alarm data.
Figure 7B:
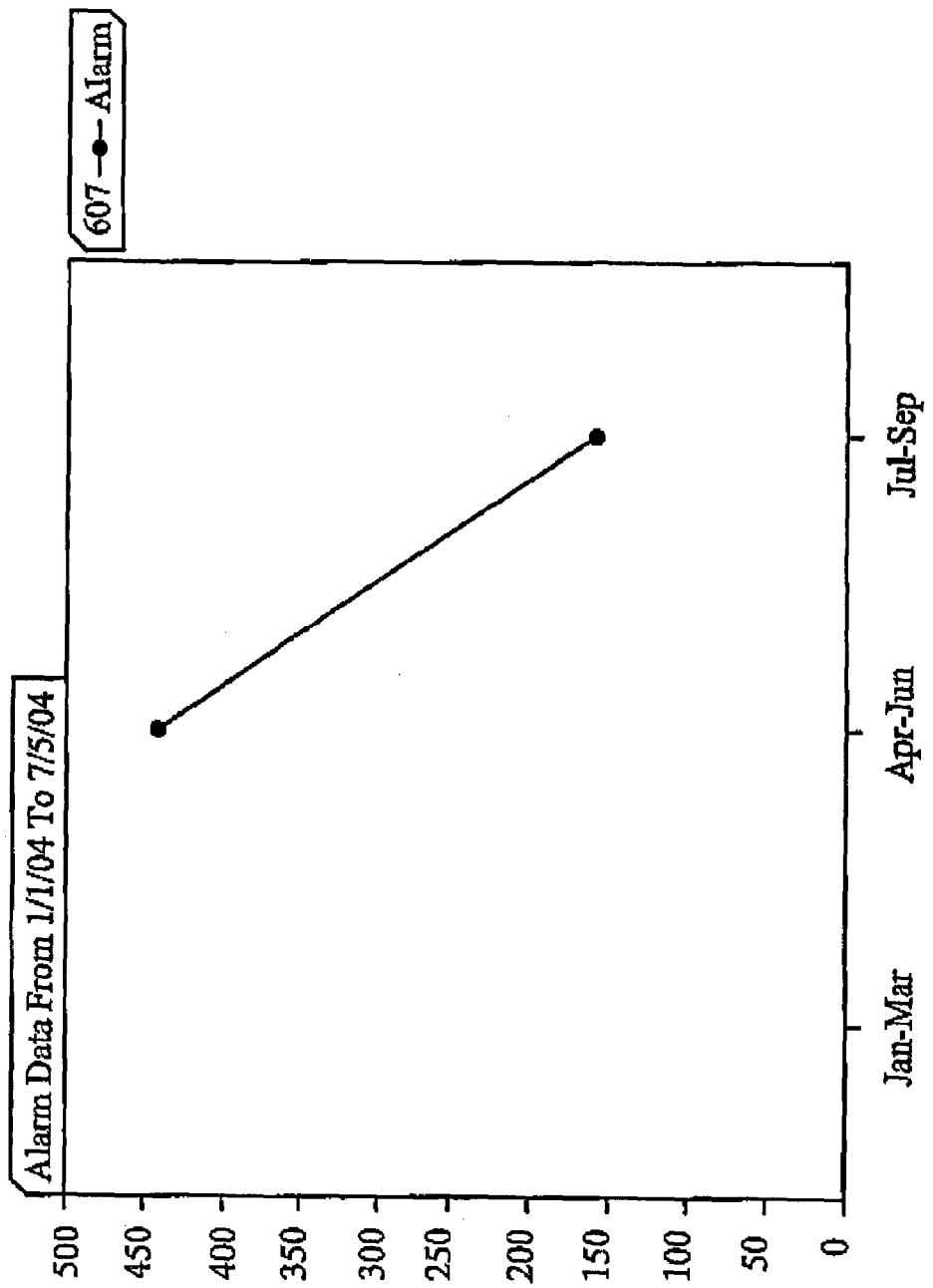
Figure 7C:
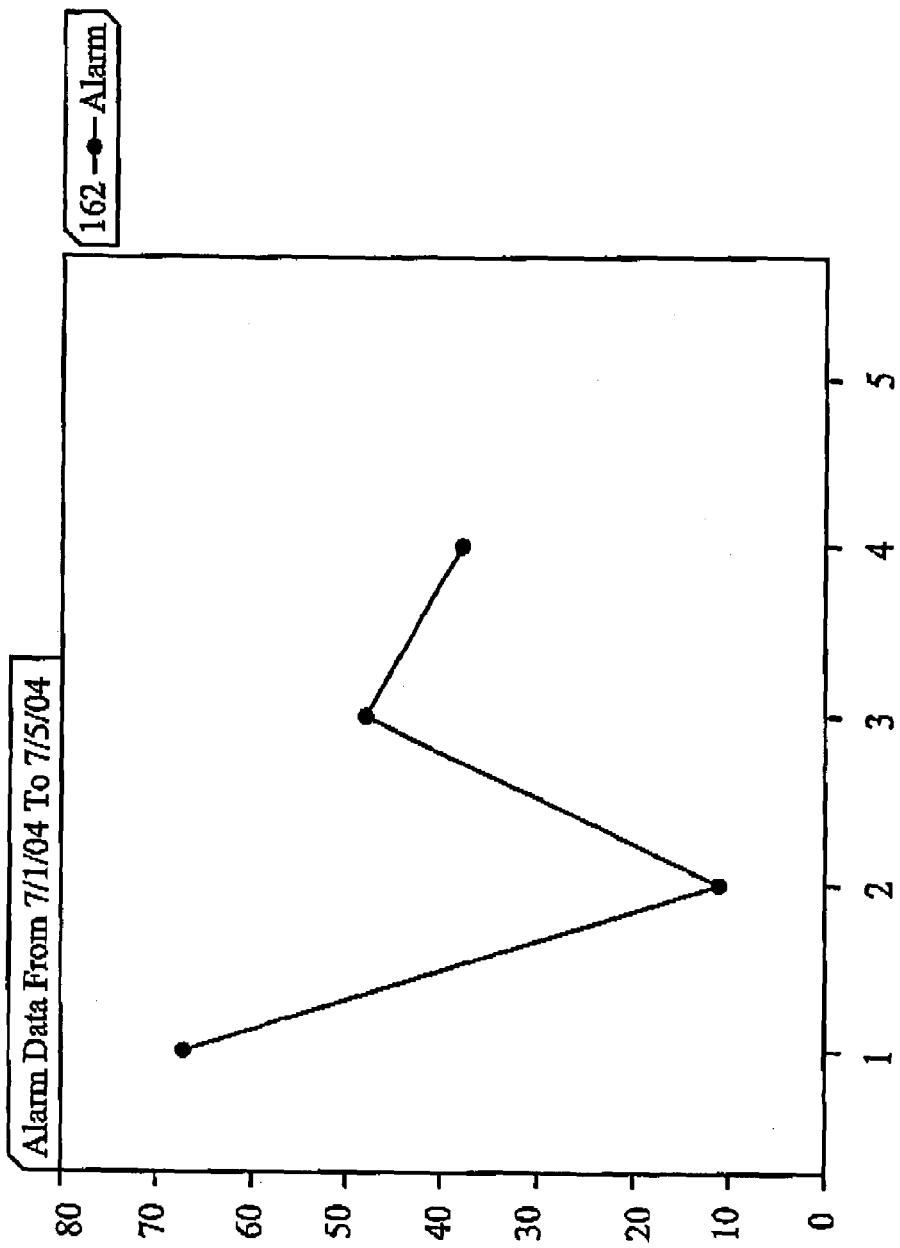
Figures 1, 10D:
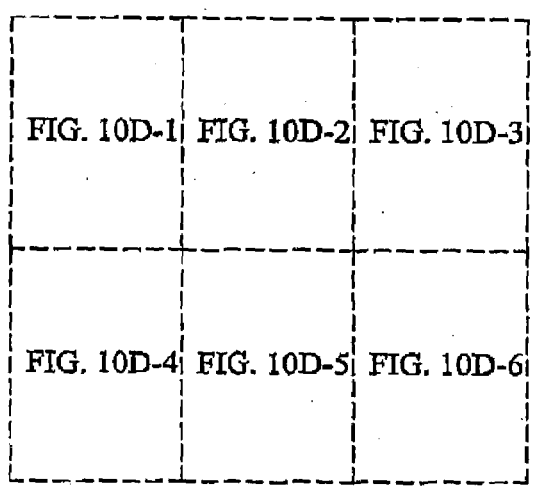
Figures 2, 10D:
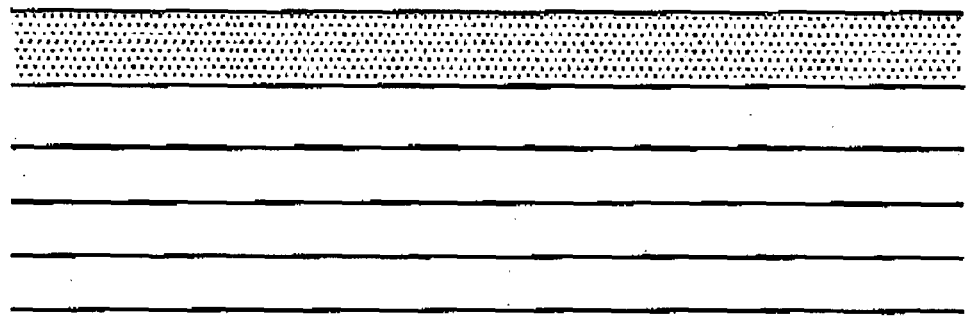

Referring to FIG. 10A, the alarm number located at intersections of the system and year dimensions are displayed on the web pages. The system dimensions is selected to drill down the alarm data to the Priority-Point-tag, as shown in FIG. 10B. As shown, the system dimension is expanded and corresponding alarm numbers are thus represented. Next, time dimension is expanded, to expand the "2004" yearly data to quarterly data and quarterly data to monthly data, as shown in FIG. 10C1-10C2. As shown, the alarm data of May, second quarter, and year 2004 is displayed. Next, the monthly hierarchy is selected, further expanding the alarm data to daily data, as shown in FIG. 10D1-10D6. As shown, the alarm data from day 13 to day 20 is displayed. The weekly report can be exported to MS Excel to be saved for processing, as shown in FIGS. 10B and 10F.

Figure 8:
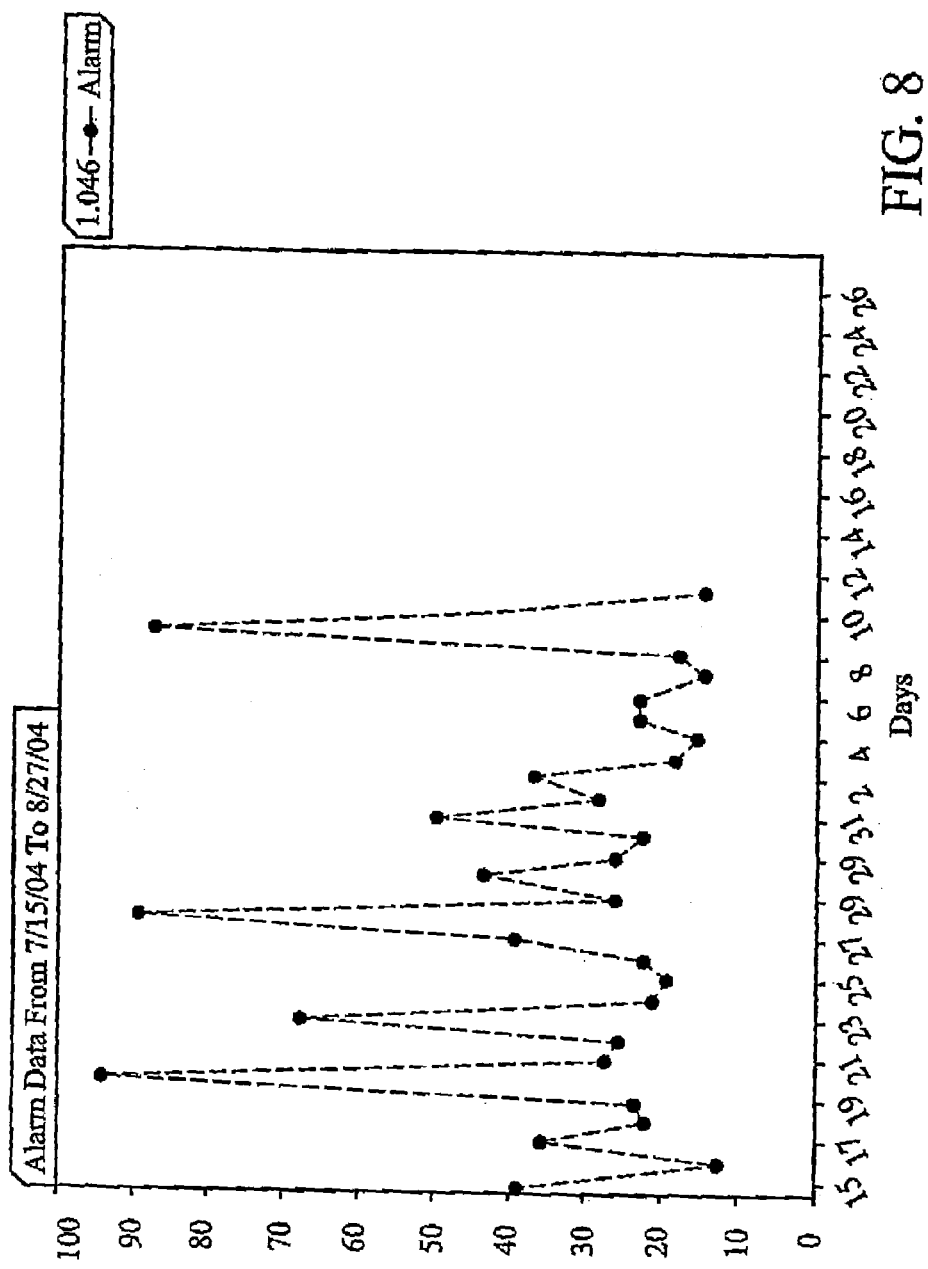
FIG. 8 is a schematic view of an embodiment of alarm data distribution tendency during a predetermined period.
Figure 9A:
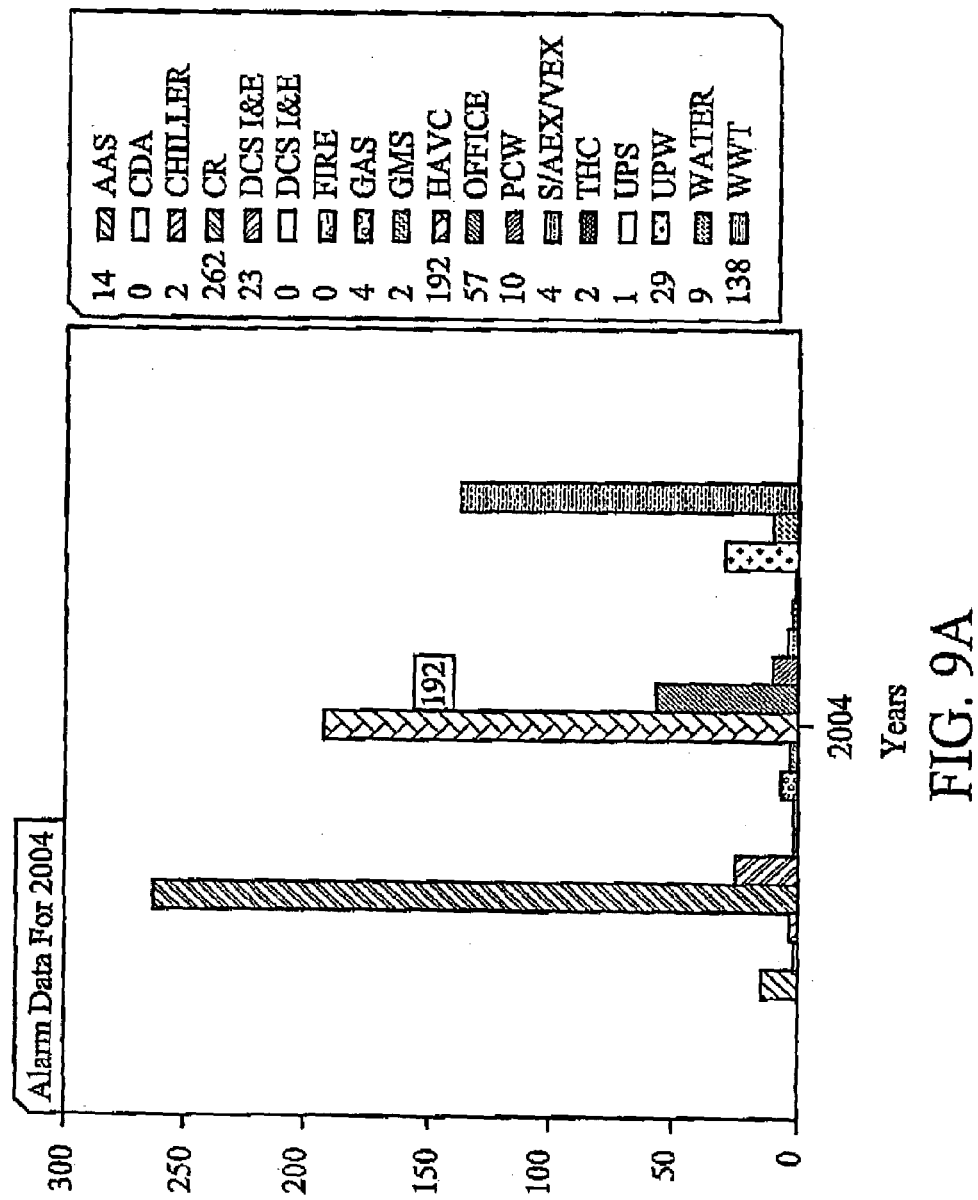
FIGS. 9A~9D are schematic views of an embodiment of drill-down function implementation to alarm data based on dimensions relating to a data cube.
Figure 9B:
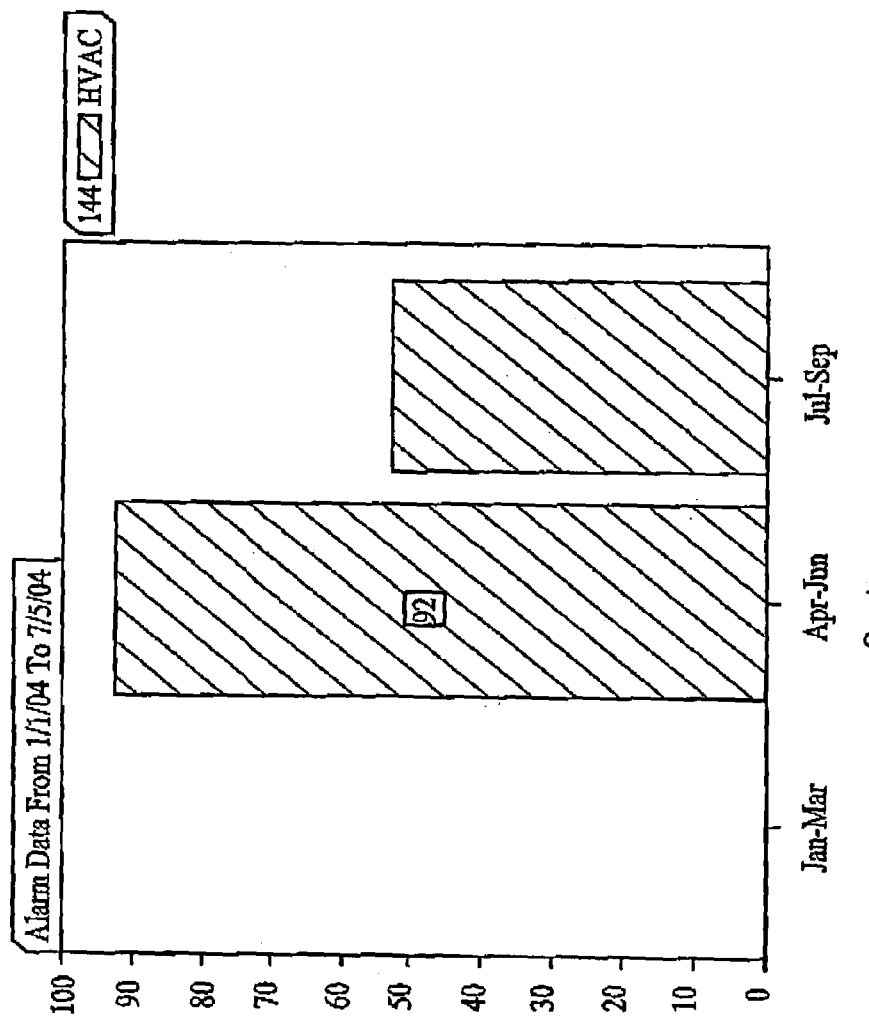
Figure 9C:
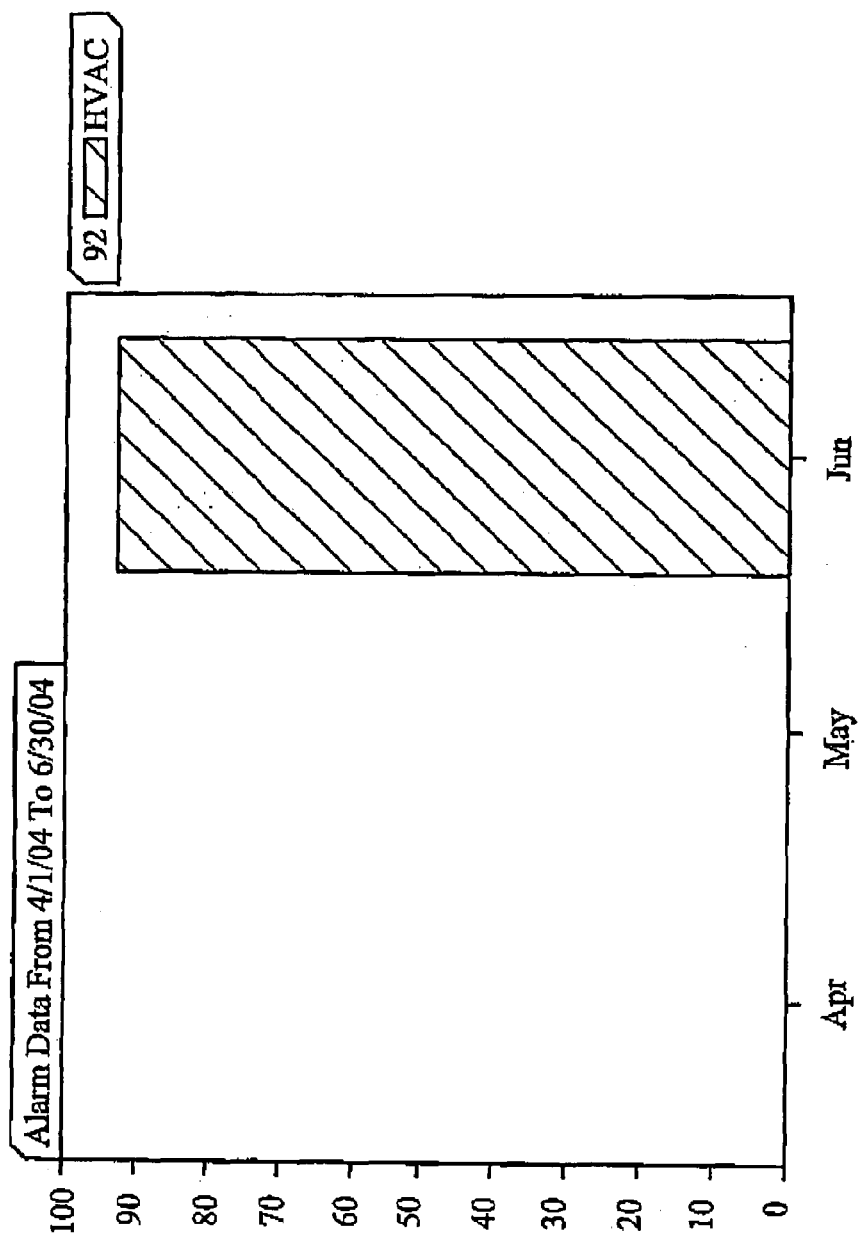
Figure 9D:
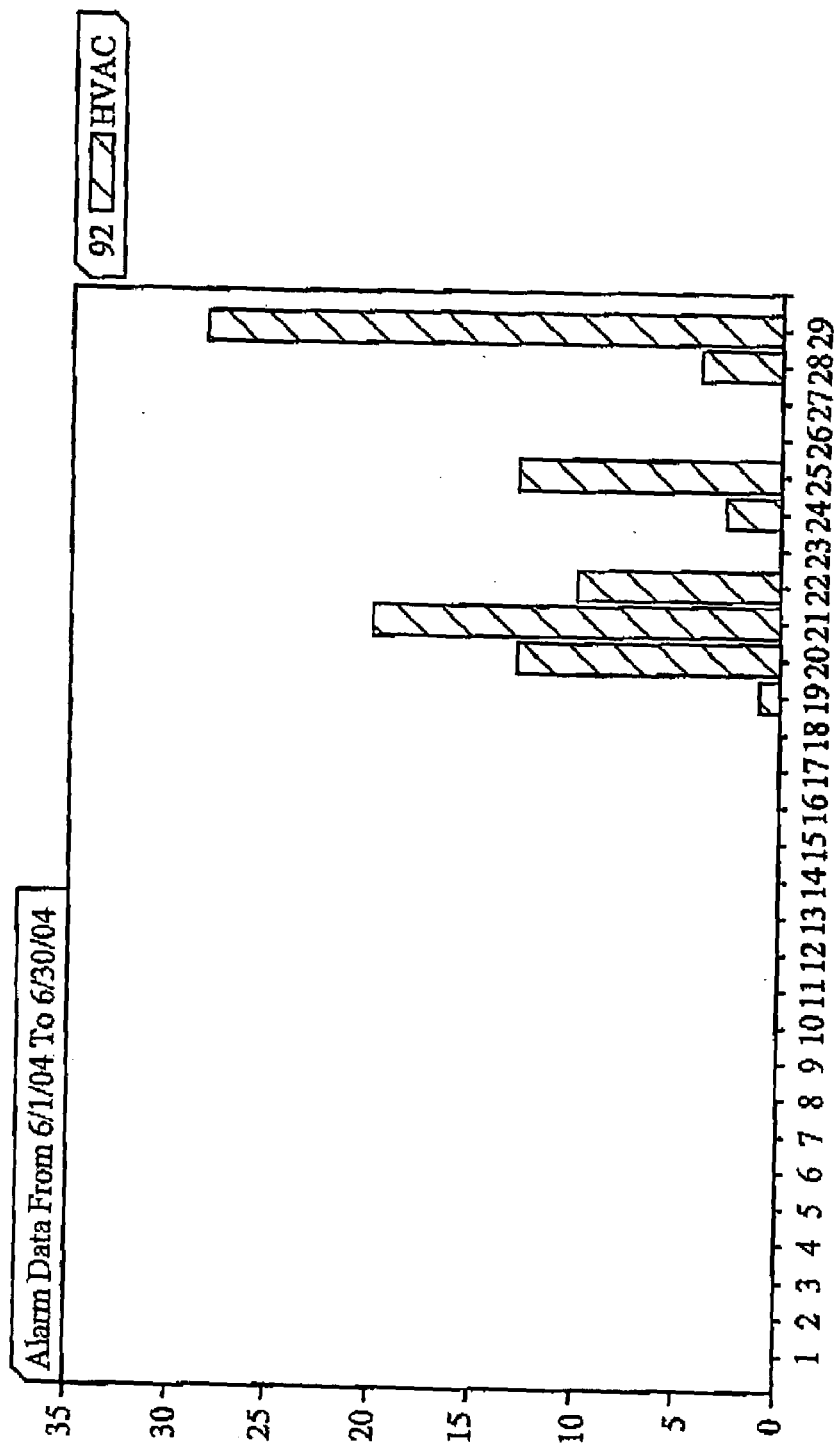

FIG. 8 is a schematic view of an embodiment of alarm data distribution tendency during a predetermined period, in which the X-axis represents the time (day) and the Y-axis represents the alarm number. Alarm numbers can be displayed at each self-defined time intervals. FIGS. 9A~9D are schematic views of an embodiment of drill-down function implementation to alarm data based on dimensions relating to a data cube. The alarm number is queried based on the system dimension, selecting the system dimension to automatically drill down the alarm data to quarterly, monthly, and daily levels. FIGS. 10A~10D are schematic views of an embodiment of drill-down function implementation to alarm data based on system and time dimensions. When the time dimension is selected, the alarm data is automatically drilled down to quarterly, monthly, and daily levels, and the system dimension then selected for rapid query and detailed expanded.

Referring to FIG. 10A, the alarm number located at intersections of the system and year dimensions are displayed on the web pages. The system dimensions is selected to drill down the alarm data to the Priority-Point-tag, as shown in FIG. 10B. As shown, the system dimension is expanded and corresponding alarm numbers are thus represented. Next, time dimension is expanded, to expand the "2004" yearly data to quarterly data and quarterly data to monthly data, as shown in FIG. 10C. As shown, the alarm data of May, second quarter, and year 2004 is displayed. Next, the monthly hierarchy is selected, further expanding the alarm data to daily data, as shown in FIG. 10D. As shown, the alarm data from day 13 to day 20 is displayed. The weekly report can be exported to MS Excel to be saved for processing, as shown in FIGS. 10E and 10F.

Figure 11:
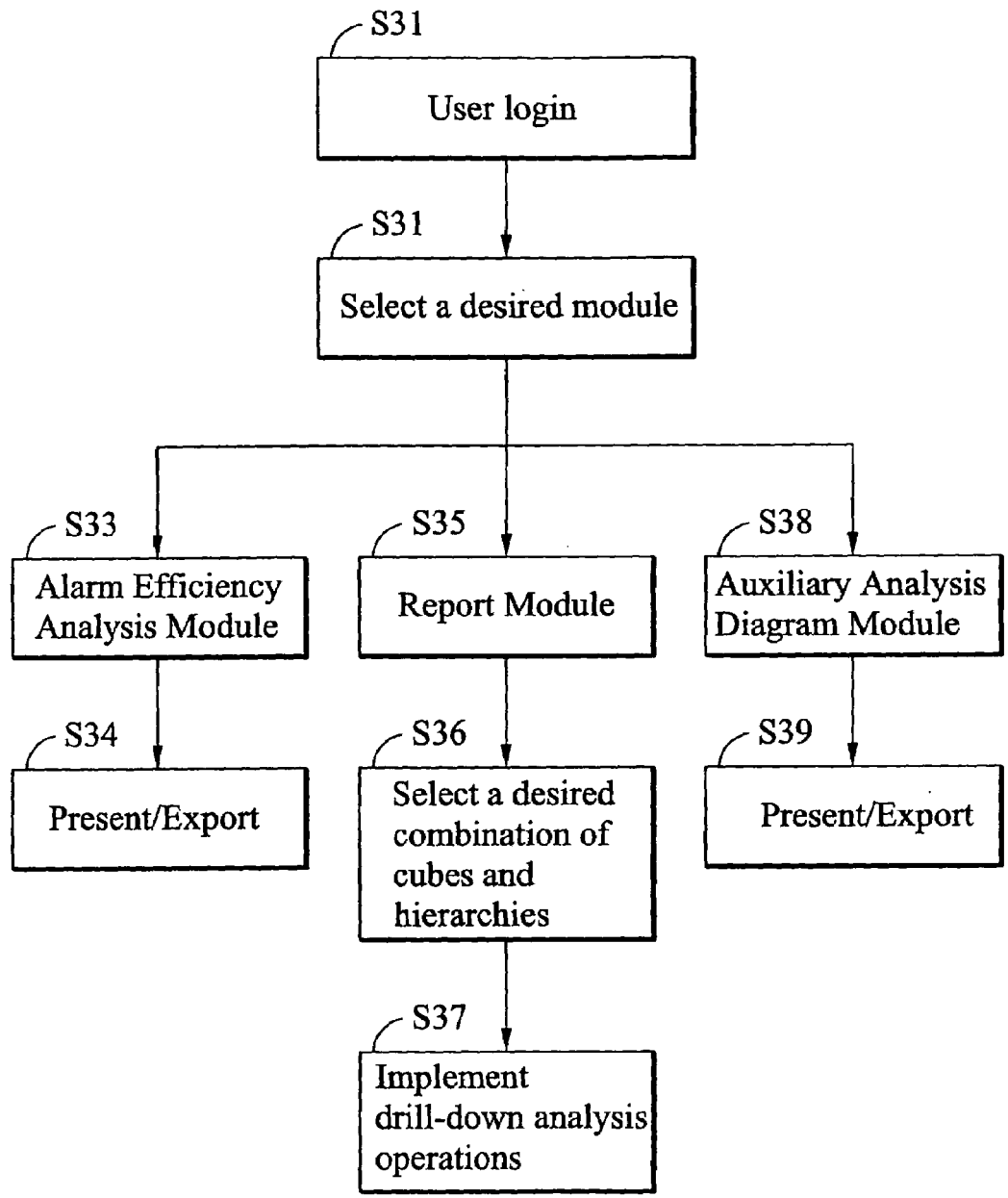
FIG. 11 is a flowchart of an embodiment of drill-down function implementation to alarm data based on alarm data dimensions.

As described in FIGS. 5A~10F, a process thereof is described in FIG. 11. FIG. 11 is a flowchart of an embodiment of drill-down function implementation to alarm data based on alarm data dimensions. A client accesses to an alarm data server (step S31), and desired alarm data module is selected (step S32). When an alarm analysis module is selected (step S33), analysis results relating to alarm data are displayed or exported (step S34). When a report module is selected (step S35), queried combination of dimensions and hierarchies relating to alarm data is then selected (step S36). A drill-down operation is implemented on the combination of dimensions and hierarchies (step S37). When an auxiliary analysis diagram module is selected (step S38), analysis results relating to alarm data are displayed or exported (step S39).

An alarm analysis system capable of multi-purpose function of the invention is fast, analytic, shared, multidimensional, and informational (FASMI), enabling free dimensions and hierarchies for multidimensional database query. Aggregate inquiry for data cubes is processed during data analysis, rapidly generating results when a drill-down operation is implemented. As described, the invention provides an improved alarm management system, appropriately sending alarms as required.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An alarm analysis method capable of multi-purpose function, comprising the steps of:
   defining a plurality of efficiency indices, including statistical-data-configuration, data-set, background-alarm-rate, peak-alarm-rate, active-alarm-distribution, bad-actors-identification, and alarm-report indices;
   creating a data warehouse according to the efficiency indices and using an online analytical processing method;
   creating a plurality of user interfaces according to the data warehouse and analysis results; and
   accessing the data warehouse using the user interfaces to retrieve the analysis results, wherein the step of creating a data warehouse further comprises the steps of:
collecting alarm data;
creating required dimensions for data cubes relating to the alarm data;
creating required hierarchies for the data cubes relating to the alarm data;
selecting storage formats relating to the alarm data;
determining pre-calculation scales relating to the alarm data; and
implementing a pre-processing operation to the alarm data.

2. The alarm analysis method as claimed in claim 1, wherein the data cubes are multidimensional data cubes.

3. The alarm analysis method as claimed in claim 2, wherein the data cubes have dimensional and measurement parts.

4. The alarm analysis method as claimed in claim 3, wherein the dimensional part of the data cube has time, system, and area parts.

5. The alarm analysis method as claimed in claim 4, wherein the data cubes have member, hierarchy, and level attributes.

6. The alarm analysis method as claimed in claim 5, wherein required alarm data is queried according to the dimensional and measurement parts and attributes of the data cubes.

7. The alarm analysis method as claimed in claim 1, wherein the background-alarm-rate index further comprises all-alarms and enabled-alarms-only indices.

8. The alarm analysis method as claimed in claim 1, wherein the active-alarm-distribution index further comprises alarms-activated and unit/display-unit-alarm-distribution indices.

9. The alarm analysis method as claimed in claim 1, wherein each user interface provides a drill-down function.

10. The alarm analysis method as claimed in claim 9, wherein low dimensional alarm data relating to the data cubes is retrieved using the drill-down function.

11. The alarm analysis method as claimed in claim 1, wherein an alarm data server is accessed using the user interfaces to browse analysis results of alarm data and implement a corresponding process, comprising the steps of:
selecting a desired alarm data module;
displaying analysis results relating to alarm data;
when a report module is selected, selecting queried combination of dimensions and hierarchies relating to alarm data;
implementing a drill-down operation to the combination of dimensions and hierarchies; and
displaying analysis results relating to alarm data when an auxiliary analysis diagram module is selected.

12. The alarm analysis method as claimed in claim 1, wherein the online analytical processing method is a multidimensional online analytical processing method (MOLAP) method, relational online analytical processing method (ROLAP) method, or hybrid online analytical processing method (HOLAP) method.

13. An alarm analysis system capable of multi-purpose function, comprising:
a server which provides a data warehouse and a user login interface; and
a client, coupled to the server, which accesses the data warehouse and uses the user interface to retrieve analysis results relating to alarm data,
wherein a data warehouse is created according to a plurality of efficiency indices using an online analytical processing method, the efficiency indices including statistical-data-configuration, data-set, background-alarm-rate, peak-alarm-rate, active-alarm-distribution, bad-actors-identification, and alarm-report indices, and being created with the steps of collecting alarm data, creating required dimensions for data cubes relating to the alarm data, creating required hierarchies for the data cubes relating to the alarm data, selecting storage formats relating to the alarm data, determining pre-calculation scales relating to the alarm data, and implementing a pre-processing operation to the alarm data.

14. The alarm analysis system as claimed in claim 13, wherein the data cubes are multidimensional data cubes.

15. The alarm analysis system as claimed in claim 14, wherein the data cubes have dimensional and measurement parts.

16. The alarm analysis system as claimed in claim 15, wherein the dimensional part of the data cubes have time, system, and area parts.

17. The alarm analysis system as claimed in claim 16, wherein the data cubes comprise member, hierarchy, and level attributes.

18. The alarm analysis system as claimed in claim 17, wherein required alarm data is queried according to the dimensional and measurement parts and attributes of the data cubes.

19. The alarm analysis system as claimed in claim 13, wherein the background-alarm-rate index further comprises all-alarms and enabled-alarms-only indices.

20. The alarm analysis system as claimed in claim 13, wherein the active-alarm-distribution index further comprises alarms-activated and unit/display-unit-alarm-distribution indices.

21. The alarm analysis system as claimed in claim 13, wherein each user interface provides a drill-down function.

22. The alarm analysis system as claimed in claim 21, wherein low dimensional alarm data relating to the data cubes is retrieved using the drill-down function.

23. The alarm analysis system as claimed in claim 13, wherein the client accesses alarm data on the server, using the user interface to browse analysis results of alarm data, and implements a corresponding process, comprising:
selecting a desired alarm data module;
displaying analysis results relating to alarm data;
selecting queried combination of dimensions and hierarchies relating to alarm data;
implementing a drill-down operation to the combination of dimensions and hierarchies; and
displaying analysis results relating to alarm data, when an auxiliary analysis diagram module is selected.

24. The alarm analysis system as claimed in claim 13, wherein the online analytical processing method is an MOLAP method, ROLAP method, or HOLAP method.

25. A computer-readable storage medium storing a computer program which provides an alarm analysis method capable of multi-purpose function, comprising using a computer to perform the steps of:
defining a plurality of efficiency indices, including statistical-data-configuration, data-set, background-alarm-rate, peak-alarm-rate, active-alarm-distribution, bad-actors-identification, and alarm-report indices;
creating a data warehouse according to the efficiency indices and using an online analytical processing method;
creating a plurality of user interfaces according to the data warehouse and analysis results; and accessing the data warehouse using the user interfaces to retrieve the analysis results, wherein the step of creating a data warehouse further comprises;

collecting alarm data;

creating required dimensions for data cubes relating to the alarm data;

creating required hierarchies for the data cubes relating to the alarm data;

selecting storage formats relating to the alarm data;

determining pre-calculation scales relating to the alarm data; and implementing a pre-processing operation to the alarm data.

26. The computer-readable storage medium as claimed in claim 25, wherein cubes are multidimensional data cubes.

27. The computer-readable storage medium as claimed in claim 26, wherein the data cubes have dimensional and measurement parts.

28. The computer-readable storage medium as claimed in claim 27, wherein the dimensional part of the data cubes have time, system, and area parts.

29. The computer-readable storage medium as claimed in claim 28, wherein the data cubes have member, hierarchy, and level attributes.

30. The computer-readable storage medium as claimed in claim 29, wherein the required alarm data is queried according to the dimensional and measurement parts and attributes of the data cubes.

31. The computer-readable storage medium as claimed in claim 25, wherein the background-alarm-rate index further comprises all-alarms and enabled-alarms-only indices.

32. The computer-readable storage medium as claimed in claim 25, wherein the active-alarm-distribution index further comprises alarms-activated and unit/display-unit-alarm-distribution indices.

33. The computer-readable storage medium as claimed in claim 25, wherein each user interface provides a drill-down function.

34. The computer-readable storage medium as claimed in claim 33, wherein low dimensional alarm data relating to the data cube is retrieved using the drill-down function.

35. The computer-readable storage medium as claimed in claim 25, wherein an alarm data server is accessed, using the user interface to browse analysis results of alarm data and implement a corresponding process, comprising:

selecting a desired alarm data module;

displaying analysis results relating to alarm data;

selecting queried combination of dimensions and hierarchies relating to alarm data;

implementing a drill-down operation to the combination of dimensions and hierarchies; and displaying analysis results relating to alarm data, when an auxiliary analysis diagram module is selected.

36. The computer-readable storage medium as claimed in claim 25, wherein the online analytical processing method is an MOLAP method, ROLAP method, or HOLAP method.

* * * * *